United States Patent [19]

Liu

[11] Patent Number: 6,097,839
[45] Date of Patent: Aug. 1, 2000

[54] METHOD AND APPARATUS FOR AUTOMATIC DISCRIMINATING AND LOCATING PATTERNS SUCH AS FINDER PATTERNS, OR PORTIONS THEREOF, IN MACHINE-READABLE SYMBOLS

[75] Inventor: Lingnan Liu, Mill Creek, Wash.

[73] Assignee: Intermec IP Corporation, Beverly Hills, Calif.

[21] Appl. No.: 08/814,001

[22] Filed: Mar. 10, 1997

[51] Int. Cl.[7] .............................. G06K 7/10; G06K 9/00
[52] U.S. Cl. .......................................... 382/181; 235/462
[58] Field of Search .................................. 235/462–464; 382/181–3, 197, 198, 267, 269

[56] References Cited

U.S. PATENT DOCUMENTS

| | | | |
|---|---|---|---|
| 4,874,936 | 10/1989 | Chandler et al. | 235/494 |
| 4,916,298 | 4/1990 | Raphaël | 235/463 |
| 4,998,010 | 3/1991 | Chandler et al. | 235/494 |
| 5,031,227 | 7/1991 | Raasch et al. | 382/22 |
| 5,052,044 | 9/1991 | Gaborski | 382/32 |
| 5,073,955 | 12/1991 | Evers | 382/21 |
| 5,124,537 | 6/1992 | Chandler et al. | 235/462 |
| 5,155,343 | 10/1992 | Chandler et al. | 235/462 |
| 5,189,292 | 2/1993 | Batterman et al. | 235/494 |
| 5,233,670 | 8/1993 | Dufour et al. | 382/22 |
| 5,241,166 | 8/1993 | Chandler | 235/494 |
| 5,243,655 | 9/1993 | Wang | 380/51 |
| 5,276,315 | 1/1994 | Surka | 235/462 |
| 5,319,181 | 6/1994 | Shellhammer et al. | 235/462 |
| 5,324,923 | 6/1994 | Cymbalski et al. | 235/454 |
| 5,373,147 | 12/1994 | Noda | 235/462 |
| 5,376,780 | 12/1994 | Klueter | 235/462 |
| 5,668,893 | 9/1997 | Kanda et al. | 382/197 |
| 5,719,967 | 2/1998 | Sekine | 382/266 |
| 5,739,518 | 4/1998 | Wang | 235/462 |
| 5,777,309 | 7/1998 | Maltsev et al. | 235/462 |
| 5,781,667 | 7/1998 | Schmidt et al. | 382/308 |
| 5,790,701 | 8/1998 | Shijo et al. | 382/205 |
| 5,854,478 | 12/1998 | Liu et al. | 235/462 |
| 5,881,171 | 3/1999 | Kinjo | 382/199 |

OTHER PUBLICATIONS

Gonzalez, Rafael C. and Paul Wintz, *Digital Image Processing*, Addison–Wesley Publishing Company, Reading, Massachusetts, 1977, pp. 39–47.

Davies, E.R., *Machine Vision: Theory, Algorithms, Practicalities*, Academic Press, London, 1989, pp. 207–215 and 265–271.

Pavlidis, Theo et al., "Information Encoding with Two–Dimensional Bar Codes," *Computer*, Jun., 1992, pp. 18–28.

Russ, John C., *The Image Processing Handbook*, CRC Press, Boca Raton, Florida, Nov., 1994, pp. 170–189.

*Primary Examiner*—Amelia Au
*Assistant Examiner*—Martin E Miller
*Attorney, Agent, or Firm*—Perkins Coie LLP

[57] ABSTRACT

A method and apparatus for locating geometric shapes or edges thereof in data collection symbols initially samples and stores an image of light reflected from the symbol. Thereafter, two routines are performed. A first routine performs low level vision processing by identifying linked points along edges, lines, curves or within shapes. A rapid pixel linking subroutine identifies edge pixels in symbol images lacking distortion. If the edge or shape suffers from distortions, then one or more distortion compensating subroutines locate sequential linked pixels despite such distortions. The resulting coordinates of linked points, which represent lines, curves and other geometric shapes, are then employed by a second routine which identifies patterns within the identified lines/curves. Based on these identified patterns, types of symbols from various symbologies can be identified and located within the stored image.

29 Claims, 6 Drawing Sheets

Fig. 9A — A CODE ONE BAR SEGMENT

Fig. 9B — A DATA MATRIX L SEGMENT

Fig. 9C — A SECTION OF MAXICODE

Fig. 9D — PROFILE OF CROSS SECTION, IDEAL CASE

Fig. 9E — CROSS SECTION PROFILE IN REAL CAPTURED IMAGE

METHOD AND APPARATUS FOR AUTOMATIC DISCRIMINATING AND LOCATING PATTERNS SUCH AS FINDER PATTERNS, OR PORTIONS THEREOF, IN MACHINE-READABLE SYMBOLS

TECHNICAL FIELD

The present invention relates to a method and apparatus for locating predetermined shapes in machine vision systems.

BACKGROUND OF THE INVENTION

Bar code symbologies are widely used for data collection. The first bar code symbologies developed, such as U.P.C., EAN, Code 39 and Code 93 can be referred to as "linear" symbologies because data in a given symbol is decoded along one direction or axis. Linear symbologies generally encode data characters as parallel arrangements of multiple width rectangular bars and spaces. Each unique pattern of bars and spaces within a predetermined width defines a particular data character. A given linear symbol encodes several data characters along its length as several groups of unique bar and space patterns.

Such linear symbologies are typically decoded using laser scanners or wand-based readers. In general, bar code readers scan a symbol and sample the scan line or lines to get a one-dimensional signal waveform and/or a sequence of distances between the bars and spaces in the symbol, and then analyze the waveform or distances to deduce the data encoded in the symbol. Various methods of decoding linear symbologies exist, such as edge-to-edge (element pairs) decoding of individual elements in a symbol, bar-to-bar or space-to-space comparisons, Factor R, and other known decoding methods.

As data collection markets grew, greater amounts of data were required to be encoded within a smaller area (i.e., greater "information density"). To increase the information density in bar code symbologies, "multi-row" or "stacked" symbologies were developed such as Code 49 and PDF417. Stacked symbologies generally employ several adjacent rows, each row having several characters defined by groups of multiple width bars and spaces.

Difficulties arose in attempting to read and decode these stacked symbologies. For example, a typical laser scanner must be precisely aligned with each row in a stacked symbol for it to scan and properly decode the groups of bars and spaces in each row. If the laser scanner is skewed so that its beam scans across several rows, the resulting scan data cannot be accurately decoded. One known method, described in U.S. Pat. No. 5,243,655 (the '655 patent) allows a laser scanner to decode stacked bar code symbols, particularly PDF417 symbols. The scanner under the '655 patent, however, requires significant processing time. Additionally, the method of decoding a stacked bar code under the '655 patent is limited to use with a laser scanner.

As the result of such limitations of laser scanners, and to accommodate the increasing information-density in developing symbologies, area or two-dimensional readers were created, to read area symbologies such as Code One, Maxi-Code and Data Matrix. "Area symbologies," as well as most stacked symbologies, are formed by a finder pattern and a set of encoded data enclosed or near the finder pattern.

U.S. Pat. No. 5,124,537 (the '537 patent) describes an area reader using virtual scan of a digital image memory to create the equivalent scanning pattern of a mechanical laser scanner. A two-dimensional image of a bar code symbol at any random orientation is captured in the image memory. A microprocessor in the reader scans the image memory to create a virtual scan equivalent to the scan pattern of a laser scanner. Alternatively, the image memory is divided into a plurality of memory segments, and virtual scan is provided simultaneously in each of the respective memory segments.

U.S. Pat. No. 5,155,343 (the '343 patent) describes an area reader that apparently improves over the method described in the '537 patent. The reader described in the '343 patent includes an image capture means for storing a two-dimensional image of the reader's field of view. The captured image may contain a bar code symbol. Once the image is captured in memory, a software method locates the bar code symbol within the stored image and provides a coarse orientation of the symbol. After the image of the bar code symbol is located, and its coarse orientation determined, the software method determines a fine orientation of the symbol. Thereafter, the method filters, scans and decodes the bar code symbol.

Numerous other known methods of locating and decoding stacked and area symbologies exist. Each method typically provides an optimal method of decoding a particular symbology, or symbologies in a particular environment. Thus, if a reader is to locate and decode several symbologies, the reader must include multiple locating and decoding methods. Since any stored image could have the image of a symbol from any of the symbologies, the reader must perform each method to ensure that all symbols in the stored image are located and decoded. However, typically due to limitations in processing power and the time required to implement such methods, only one of such methods is typically included in a given reader. Furthermore, if the reader is to handle various types of damage to which the symbol may suffer, such as printing errors, optical distortions, etc., the reader must include even more methods for handling such situations. This requirement further adds to the complexity of the reader and slows the processing time to locate and decode symbol images within a stored image.

SUMMARY OF THE INVENTION

The inventor has determined that finder patterns of existing stacked and area symbologies, as well as linear symbologies, are based on the simplest geometric structures, such as linear patterns or solid ring/circular patterns. Even if the finder pattern is damaged due to label damage, poor print quality, media surface reflection, blurring due to improper focusing, optical distortions, or other errors, the present invention can nevertheless reliably and accurately locate the finder pattern in stored images.

An embodiment of the present invention locates images of symbols within a stored image under a basic two-step process. First, the embodiment of the present invention finds low-level information, such as edges, lines, curves, and other basic geometric information. Secondly, the embodiment of the present invention groups the gathered information together to interpret the symbol and identify a symbology from which the symbol was generated. As a result, the embodiment of the present invention can be used as a general automatic symbol discrimination system for various symbologies.

A method and apparatus for locating smoothed curves representing geometric shapes of the finder pattern thereof in data collection symbols initially samples and stores an image of light reflected from the symbol. Thereafter, two routines are performed. A first routine performs low level vision processing by identifying linked points along lines or curves or along boundaries or geometric characteristics representing a basic structure of the finder pattern. A rapid pixel linking subroutine identifies and groups edge pixels in symbol images lacking distortion. If the edge or shape suffers from distortions, then one or more distortion compensating subroutines locate sequential linked pixels despite such distortions. The combined sequential linking method robustly finds the geometric shape of finder patterns. The resulting coordinates of linked points, which represent lines, curves and other geometric shapes, are then employed by a second routine which identifies patterns within the identified lines/curves. Based on these identified patterns, types of symbols from various symbologies can be identified and located within the stored image.

In a broad sense, the present invention embodies a computer-implemented method for locating an image of machine-readable visual indicia. The image is represented by a plurality of points, and the machine-readable visual indicia has a predetermined pattern of geometric shapes. The method includes the steps of: (a) detecting a set of curves in the stored image based on groups of points in the plurality of points, wherein each group of points corresponds to one of the curves and wherein at least some of the curves in the set of curves represent at least portions of the geometric shapes of the predetermined pattern; (b) determining if curves in the set of curves correspond to one of several selected patterns of curves, a first selected pattern corresponding to the predetermined pattern of geometric shapes of the machine-readable visual indicia; and (c) identifying the machine-readable visual indicia in the image if curves in the set of curves correspond to the first selected pattern.

The present invention also embodies a computer implemented method of locating an image of a data collection symbol in a two-dimensional stored image, the two-dimensional stored image being represented by a plurality of points and the data collection symbol having a predetermined pattern of geometric shapes. The method includes the steps of: (a) detecting geometric portions of the data collection symbol in the two-dimensional stored image based on groups of points in the plurality of points; (b) determining if the detected geometric portions correspond to one of several selected patterns of geometric portions, a first selected pattern corresponding to the predetermined pattern of geometric shapes of the data collection symbol; and (c) identifying the data collection symbol in the two-dimensional stored image if the detected geometric portions correspond to the first selected pattern.

DETAILED DESCRIPTION OF THE INVENTION

A machine vision system, and in particular, an apparatus and method for locating and processing data collection symbols or other machine-readable images, is described in detail herein. In the following description, numerous specific details are set forth such as specific linear or stacked symbols, specific methods of locating symbols, etc., in order to provide a thorough understanding of the present invention. One skilled in the relevant art, however, will readily recognize that the present invention can be practiced without the specific details, or with other symbols, methods, etc. In other instances, well-known structures or operations are not shown in detail in order to avoid obscuring the present invention.

Figure 1:
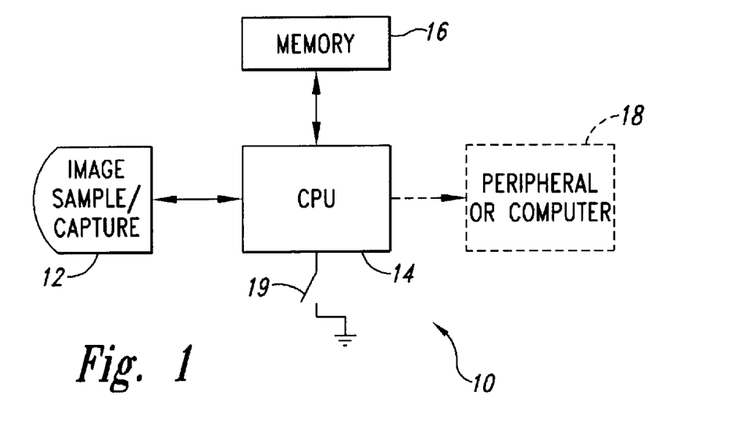
FIG. 1 is a block diagram of a data collection symbology reader of the present invention.

As shown in FIG. 1, a data collection symbology reader 10 under an embodiment of the present invention includes an image sampling or capturing device 12. As used generally herein, a "data collection symbol" refers to a symbol from any of the linear, stacked, area and other machine-readable symbologies. An "area" symbology, such as MaxiCode, Data Matrix or Code One, employs a matrix of data cells rather than one or more rows of bars and spaces. The height and width of each data cell within the matrix are generally equal, and the height and width of the symbol are generally comparable.

In an exemplary embodiment, the image capture device 12 is an area imager that contains an array of photosensitive elements, preferably a charge-coupled device ("CCD") having, for example, a rectangular active surface of 582×752 pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The 582×752 pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. Alternatively, each pixel element in the CCD array of the area imager can output a signal that indicates the gray intensity value of the particular pixel element. The signals output from the CCD array are similar to video data. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the video data signals output from the area imager. The CPU 14 preferably includes an analog-to-digital converter that converts the gray level analog signals from the area imager into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g. random access and electronically erasable read only memory). An object or image within the field of view of the area imager is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager to provide image signals to the CPU that constitute the instantaneous image within the field of view of the area imager. The specific means and method for storing an image of a symbol by the symbology reader 10 are conventional and will be understood by those skilled in the relevant art without need for further description herein.

Figure 2:
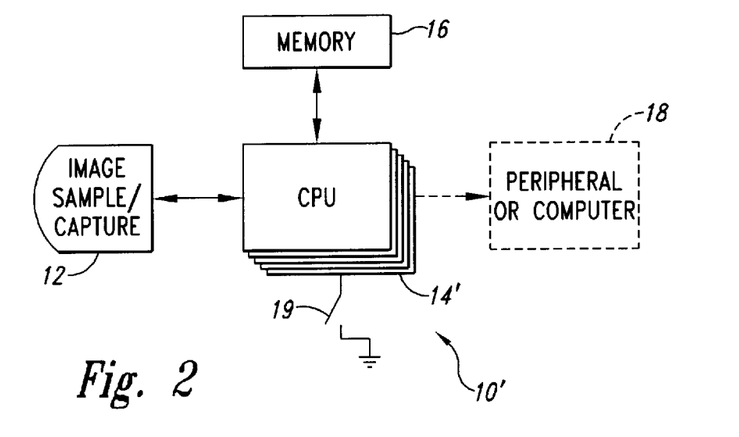
FIG. 2 is a block diagram of an alternate embodiment of the data collection symbology reader of FIG. 1.

Referring to FIG. 2, in an alternative embodiment, a symbology reader 10' includes multiple processors or CPUs 14'. Each of the CPUs 14' can be dedicated to a particular subroutine, or various modules or tasks can be divided among the CPUs based on their availability, as described below. While the present invention is generally described herein with respect to the reader 10 of FIG. 1, those skilled in the relevant art will readily understand that the discussion applies equally to the reader 10' of FIG. 2.

Under the embodiment of the present invention described below, the reader 10 or 10' performs several subroutines for locating portions of finder patterns that suffer from distortions. As generally used herein, a symbol or stored image suffers from "distortions" if it contains or suffers from damage, spots or voids, printing defects, optical or perspective distortions, surface distortions (e.g., when placed on a non-planar surface), resolution distortions, noise, or any other defects, damage or distortions which cause the symbol or the symbol image to deviate from an ideal symbol/image.

Figure 3:
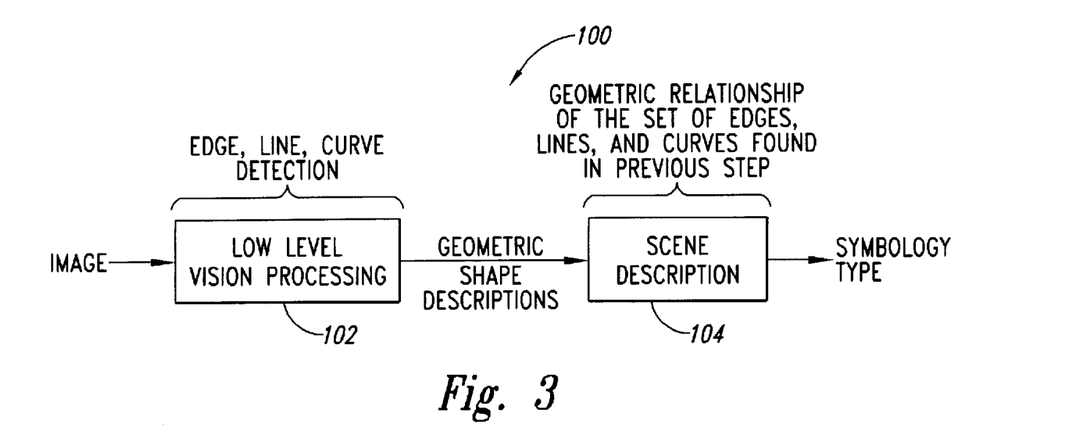
FIG. 3 is a basic block diagram of a method performed by the reader of FIG. 1.

Referring to FIG. 3, a routine 100, executed by the CPU 14, or divided among the CPUs 14', reads an image of a data collection symbol within the memory 16 of the symbology reader 10. The routine 100 is preferably performed with one or more high-speed CPUs, and in readers having two-dimensional sampling of pixels within a stored image. However, the present invention can also be employed with laser scanner readers, pen-based readers, and other known machine-readable symbol readers. The routine 100, and all the routines, subroutines, and methods described herein, are permanently stored within the non-volatile memory portion of the memory 16.

Those skilled in the relevant art can create source code based on the flowcharts and detailed description provided herein. While the routine 100 is preferably stored in the memory 16, the routine 100 could also be formed as firmware or in hardware.

The routine 100, in sum, performs two routines to abstract information from a stored image. In routine 102, the CPU 14 extracts low-level information from the stored image, such as information regarding edges, lines, curves, or other shapes within the stored image. In routine 104, the CPU 14 employs the edge or shape information to determine groupings or interrelations of such information. For example, the CPU 14 analyzes the length, positioning, spacing, etc., of the determined geometric information to attempt to identify finder patterns for certain symbologies. Therefrom, the CPU 14 in step 104 identifies the symbology type for a symbol image, such as the symbol image in the stored image. As a result, the routine 100 operates as a general autodiscriminator to identify symbols and their corresponding symbologies within a stored image.

Figure 4:
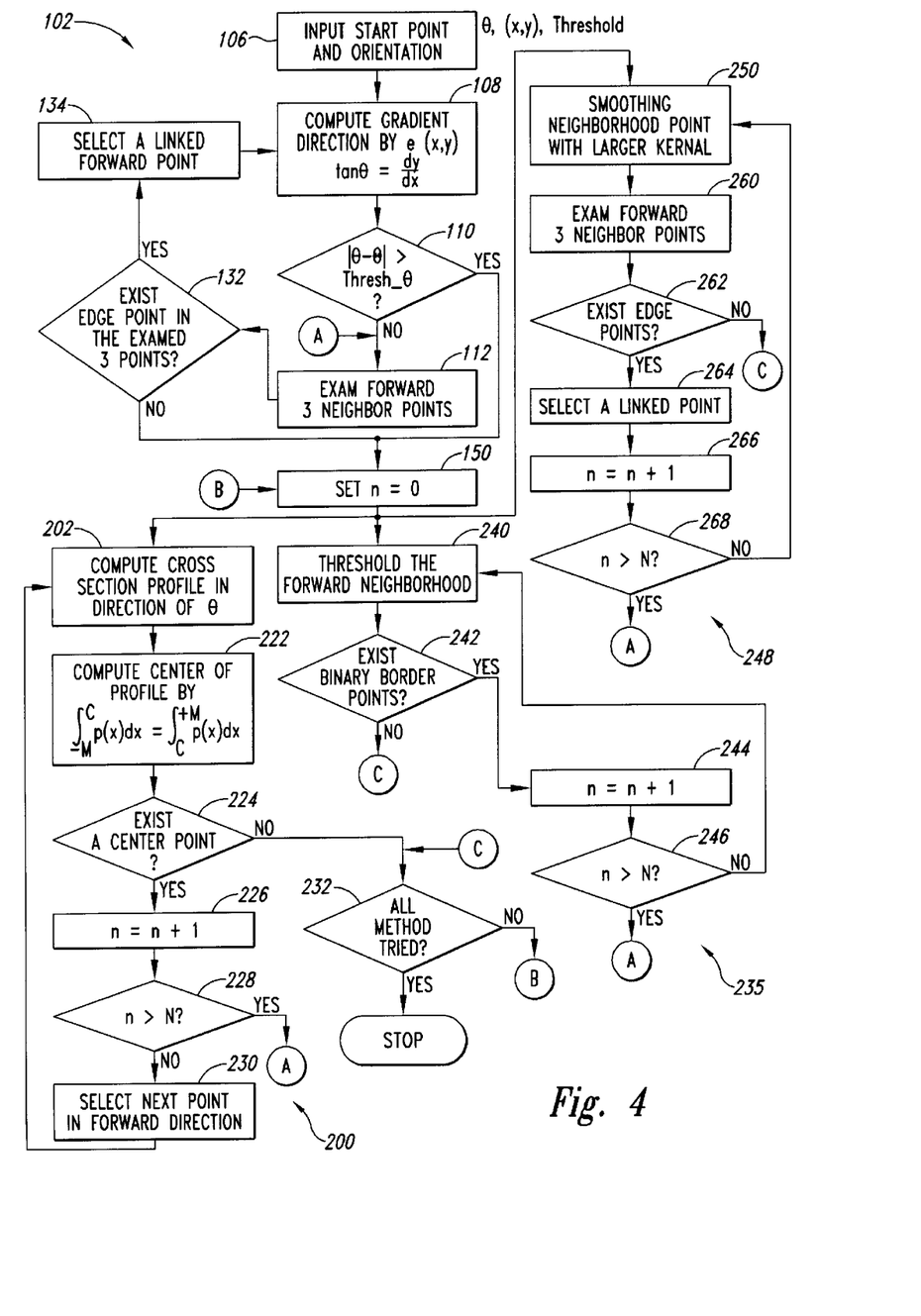
FIG. 4 is a flow diagram of an exemplary method for low-level vision processing performed by the reader of FIG. 1.

Referring to FIG. 4, the routine 102 for abstracting low-level information is shown in greater detail. Prior to performing the routine 102, the CPU 14 produces one or more signals based on light reflected from a symbol, and stores the signals as an image or partial image of the symbol. As explained herein, various methods and apparatus for receiving light reflected from the symbol and producing signals therefrom are known to those skilled in the art. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains an image of the symbol or symbols to be read.

The memory 16 includes for processing efficiency an array of memory locations addressed by the CPU 14 that correspond to and represent the pixels in the field of view of the CCD array. The stored image is referenced by a Cartesian coordinate system so that the location of each pixel is represented by a pair of numbers indicating the horizontal and vertical position of the pixel in the stored image. Therefore, objects within the stored image, i.e., areas or groups of pixels, lines/paths formed therethrough, etc., can be arithmetically determined using known geometric and trigonometric properties based on the coordinate system as described herein (e.g., by equations of lines, trapezoids, or other geometric or trigonometric equations used for representing planar objects).

Prior to performing the routine 102, the CPU 14 also determines the location of a starting point of a symbol in the stored image using known techniques such as by using virtual scans of or several sampling paths through the stored image. As a result, the CPU 14 locates at least an edge point of one bar or space in the symbol, or a "defined portion" or finder pattern of a symbol in a given symbology that is unique for that particular symbology. The CPU 14 locates and stores in the memory 16 the Cartesian coordinates of the starting point of each symbol located in the stored image. For a linear symbology, the starting point is preferably a point along an edge between a bar or a space in the symbol, and can be a point along the edge of the outermost bar in the start or stop pattern for the symbol, adjacent to the quiet zone. For a stacked or area symbology, the starting point is preferably a point along an edge of the finder pattern or defined portion. The starting point is preferably at an edge between multiple white pixels (representing the quiet zone) and several black pixels (representing a beginning of the finder pattern, bar or other element within the symbol image).

Referring to FIG. 4, the routine 102 begins in step 106 where the CPU 14 computes or retrieves from the memory 16 the X and Y axes coordinates of the starting point, which is also an edge point, an orientation Θ of the edge at the starting point, and an intensity threshold in a region about the starting point. The orientation Θ of the edge at the starting point can be found by conventional methods, such as using a digital form of the gradient equation (shown below as the right-hand side of equation (1)), and computing the direction of the gradient as Θ. The threshold intensity can likewise be computed by conventional means, such as analyzing a 200×200 pixel area for an average intensity value. Therefrom, the CPU 14 can determine that pixel intensity values greater than the threshold corresponds to white pixels (e.g., binary value 1), while pixel intensity values below the threshold correspond to black pixels (e.g., binary 0 values).

In step 108, the CPU 14 computes the gradient direction of the starting point under the following equation:

$$\tan\theta = dy/dx \cong \frac{I(y+1, x) - I(y-1, x)}{I(y, x+1) - I(y, x-1)} \quad (1)$$

The "gradient directions" angle θ refers to the direction of greatest change in pixel intensity I(x,y) from a given pixel (x,y) with respect to the edge direction at that pixel or point. In the present invention, the gradient direction angle at a given point is generally perpendicular to the boundary of a bar or other feature in the symbol image at that point. Of the terms "pixel" and "point" are generally used interchangeably herein.

In step 110, the CPU 14 determines whether the absolute value of the difference between the computed gradient direction θ and the edge orientation Θ is greater than a threshold angle. In other words, the CPU 14 in step 110 performs the following equation:

$$|\theta-\Theta| > \text{Thresh}\_\theta \quad (2)$$

The gradient direction θ is typically perpendicular to an edge, and thus perpendicular to the edge orientation Θ. Therefore, if the difference between the gradient direction θ and the edge orientation Θ differs greatly from 90° (e.g., Thresh_θ=120°), then the CPU determines that an end or corner position likely exists at the current point. If so, then the routine 102 performs one or more of several methods to detect edges in differing environments, as described below. If the difference between the gradient direction and the edge orientation is less than the threshold Thresh_θ, then in step 112 the CPU 14 examines three neighboring points in a forward direction from the current point.

Figure 5:
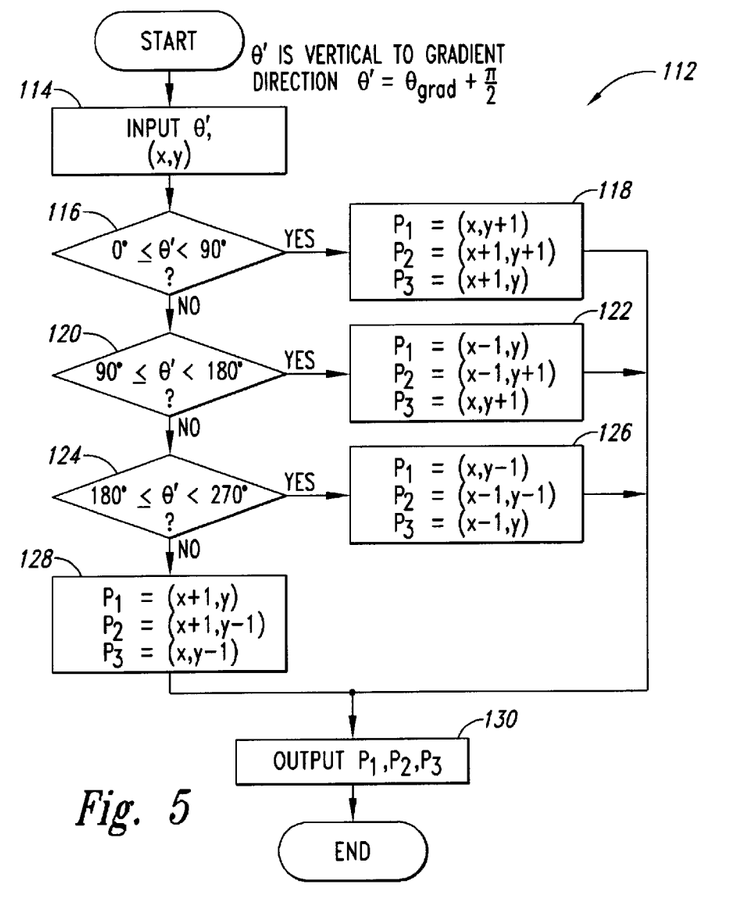
FIG. 5 is a flow diagram of an exemplary subroutine for examining a neighborhood of points or pixels in a digitized image.

Referring to FIG. 5, the step or subroutine 112 shown in greater detail for identifying the three neighboring points. The subroutine 112 essentially determines which three neighboring points are in a "forward" direction of the current point. In step 114, the CPU 14 computes an angle θ' which is perpendicular or vertical to the gradient direction θ (i.e., θ'=θ±π/2). Additionally, the CPU 14 in step 14 inputs the X and Y axes coordinates of the current point.

Figure 6:
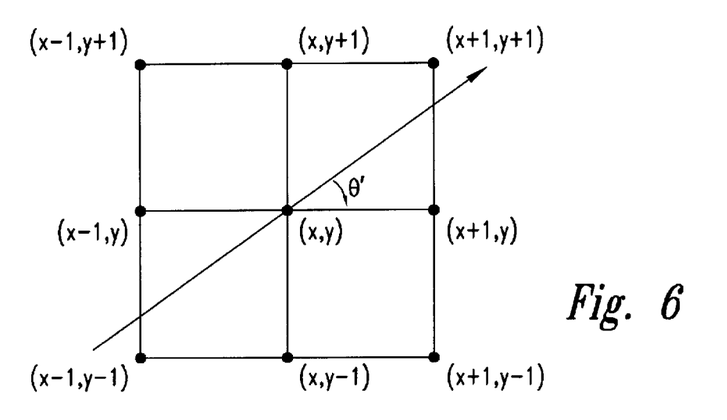
FIG. 6 is a schematic diagram of a neighborhood of points surrounding a currently examined point.

In step 116, the CPU 14 determines whether the angle θ' is between 0 and 90°. If so, then in step 118, the CPU 14 determines that the three neighboring points forward of the current point are at point or pixel locations $P_1$=(x, y+1), $P_2$=(x+1, y+1), and $P_3$=(x+1, y). As shown in FIG. 6, the current point has coordinates (x,y) and is positioned at the center of a 3-pixel×3-pixel region. With the angle θ' less than 90° from a horizontal line, points $P_1$ through $P_3$ are the upper- and right-most three points from the current point (x,y). FIG. 6 also shows the three neighboring points in the "forward" direction for the other three directions, as described below.

If the angle θ' is not between 0 and 90°, then in step 120 the CPU 14 determines whether the angle is between 90° and 180°. If so, then in step 122, the CPU 14 determines the forward three points are $P_1$=(x−1, Y), $P_2$=(x=1, y+1), and $P_3$=(x, y+1). If the angle θ' is not between 90 and 180°, then in step 124 the CPU 14 determines whether the angle is between 180° and 270°. If so, then in step 126, the CPU 14 determines that the forward three points are $P_1$=(x, y−1), $P_2$=(x−1, y−1), and $P_3$=(x−y, y). If the angle θ' is not between 180° and 270°, the in step 128, the CPU 14 determines that the forward three points are: $P_1$=(x+1, y), $P_2$=(x+1, y−1), and $P_3$=(x, y−y). Following step 118, 122, 126 or 128, the CPU 14 in step 130 outputs the coordinates of the forward three points $P_1$, $P_2$, and $P_3$, and returns to the routine 102.

Referring back to FIG. 4, the CPU 14 in step 132 examines the forward three points $P_1$ through $P_3$ to detect an edge point. If an edge point exists, then in step 134, the CPU 14 selects one of the forward three points as a next edge point.

Figure 7:
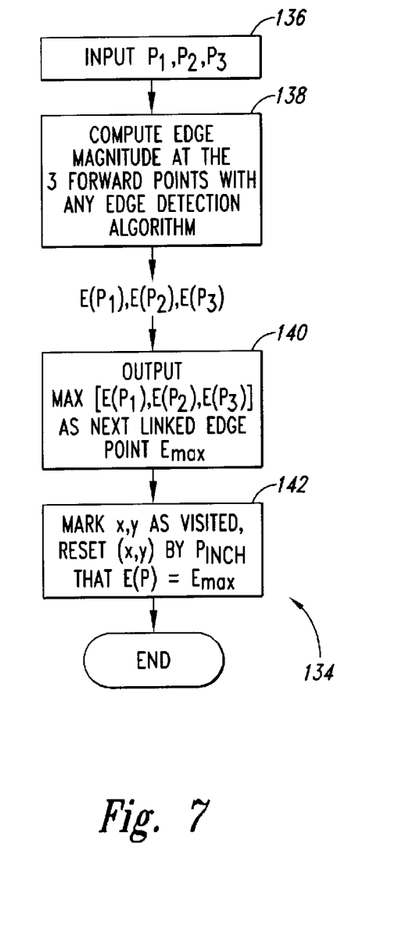
FIG. 7 is a flow diagram of an exemplary subroutine for selecting one of a neighborhood of points in the digitized image under a sequential linking operation.

Referring to FIG. 7, the step or subroutine 134 for selecting one of the forward three points $P_1$ through $P_3$ as an edge point begins at step 136 wherein the three points are retrieved from the memory 16. In step 138, the CPU 14 computes an edge magnitude for the forward three points with any of known conventional edge detection or edge operator algorithms. For example, the CPU 14 in step 138 determines a change in intensity of neighboring points with respect to each of the forward three points $$\left(\text{e.g.,  } E(P_1) = \sqrt{(dx_1)^2 + (dy_1)^2} \text{  or  } |dx_1| + |dy_1| \text{ or }\right.$$
$$\left.\max(|dx_1|, |dy_1|), \text{ etc.}\right).$$

Based on step 138, the CPU 14 produces three edge magnitude values for the forward three points: $E(P_1)$, $E(P_2)$ and $E(P_3)$.

In step 140, the CPU 14 outputs the maximum of the three edge magnitude values $E(P_1)$ through $E(P_3)$ as the next edge point (i.e., $E_{max}$=max[$E(P_1)$), $E(P_2)$, $E(P_3)$]). In step 142, the CPU 14 flags or marks the current point at (x,y) as visited, and resets the current edge point as the X and Y axes coordinates of the next edge point selected under step 140. Thereafter, the subroutine 134 ends and outputs the next edge point as the current point.

Referring back to FIG. 4, the CPU 14 again performs steps/subroutines 108, 110, 112, 132, and 134 as the CPU incrementally or sequentially advances along a boundary and links edge pixels. Under the subroutine 134, the CPU 14 updates the initially input variables, for example, updating the edge orientation θ based on a currently determined gradient direction Θ. Under step 142 of the subroutine 134, the CPU 14 also stores the X and Y axes coordinates of each selected linked point in a list of linked points. If the difference between the gradient direction θ and the edge orientation Θ is greater than the threshold angle Thresh_θ under step 110, or no edge point exists within the forward three points under step 243, then the CPU 14 in step 150 sets a counter value n to zero. Following step 150, a CPU 14 begins several different methods for attempting to locate a next edge point of the symbol image. Each of the several methods attempts to locate an edge point when the symbol image suffers from various distortions.

Figure 8:
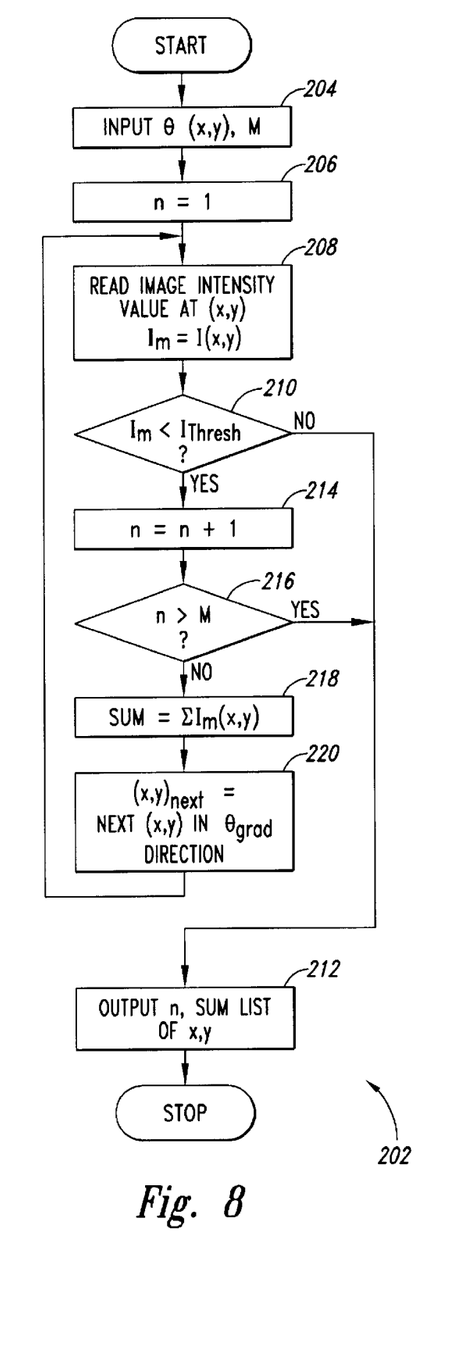
FIG. 8 is a flow diagram of an exemplary subroutine for determining a cross-sectional profile of a shape in the digitized image.

Considering a first distortion compensating subroutine 200 that tracks through the center, rather than edge, of a shape in the symbol image, the CPU 14 in step 202 computes a cross-sectional profile through the shape that is adjacent to the current edge point. Cross-sectional profiles of portions of various finder patterns are illustrated in FIGS. 9A through 9E. Referring to FIG. 8, the step or subroutine 202 begins in step 204 where the CPU 14 inputs the gradient direction θ, the X and Y axes coordinates of the current point (xy), and a maximum allowable X dimension value M. As is known, the "X dimension" of a symbol is the nominal width dimension of the narrow bars and spaces or data cells in a data collection symbol. Additionally, finder patterns for most symbologies have a width equal to the X dimension, as noted below. The value of M corresponds to a maximum X dimension, in number of pixels, that the CPU 14 expects to encounter with any symbol image.

In step 206, the CPU 14 sets the counter value n to 1. In step 208, the CPU 14 reads an image intensity value $I_m$ at the current point (i.e., $I_m=I(x, y)$). In step 210, the CPU 14 determines whether the image intensity value $I_m$ is less than an intensity threshold value $I_{thresh}$. The image intensity threshold value $I_{thresh}$ can be the threshold value previously established or input under step 106 (FIG. 4), an adjustment therefrom, or another local intensity threshold value. If the current image intensity value $I_m$ is greater than the threshold, then the CPU 14 in step 210 determines that the current shape has not been crossed, and thus in step 214 increments the counter value n by I.

In step 216, the CPU 14 determines whether the counter value n is greater than the maximum X dimension value M. If not, then in step 218, the CPU 14 sums the intensity values under the equation below:

$$\text{Sum}=\Sigma I_m(x_n, y_n) \quad (3)$$

In step 220, the CPU 14 selects the next point to be examined as the next point in the gradient direction θ. Thereafter, the subroutine 202 loops back to step 208.

The CPU 14 again performs steps 208, 210, 214, 216, 218, and 220 as the CPU incrementally examines pixels extending along a gradient direction through the current shape. If the image intensity value $I_m$ of a currently examined point is greater than the intensity threshold $I_{thresh}$ in step 210, or the counter value n is greater than the maximum X dimension M in step 216, then the CPU 14 outputs the current value of the counter n, the summation of the intensity values Sum, and the list of X and Y axes coordinates of the points examined along the gradient direction under step 212, and the subroutine 202 ends.

Referring back to FIG. 4, the CPU 14 in step 222 computes the center of the computed cross-sectional profile under the equation below:

$$\int_0^C p(x)dx = \int_C^n p(x)dx \quad (4)$$

where C is a centerpoint of the profile, and p(x) is a position along a gradient direction through the currently examined shape. Under step 222 (and the other steps under the first distortion compensating subroutine 200), the CPU 14 effectively applies a low-pass filtering to the stored image to avoid noise which may exist along a currently tracked edge. For example, selecting a linked point under step 134 can employ a derivative function and therefore be particularly sensitive to noise. A fuzzy or erratic edge can lead to variations in the gradient direction θ and other problems which can cause steps 108 through 134 to miscalculate or be thrown off at a tracked edge. By analyzing the center of a shape, rather than its edge, under the subroutine 200, the CPU 14 compensates for such noise.

Figure 9A:
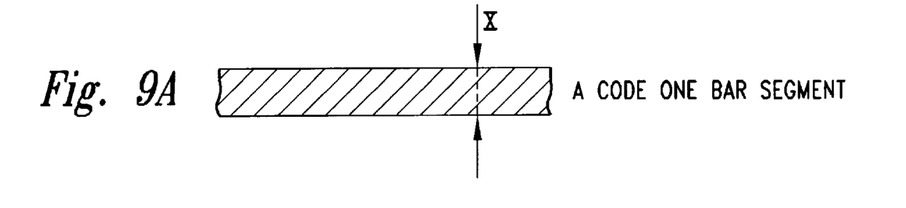
FIG. 9A is a schematic diagram of a Code One bar segment and a cross-section formed therethrough.
Figure 9B:
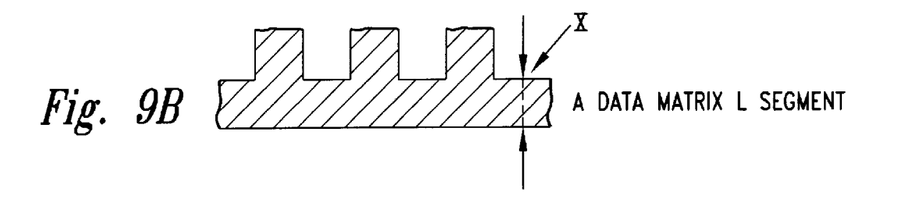
FIG. 9B is a schematic diagram of a Data Matrix bar segment and a cross-section formed therethrough.
Figure 9C:
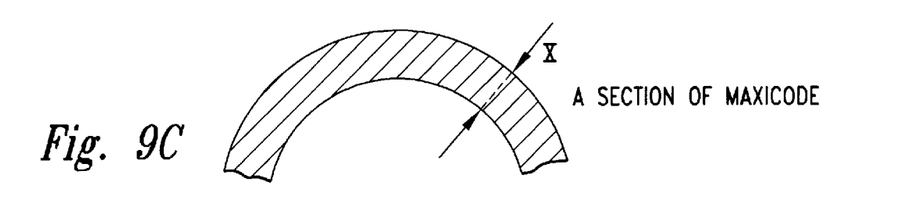
FIG. 9C is a schematic diagram of a MaxiCode finder pattern ring and a cross-section formed therethrough.
Figure 9D:
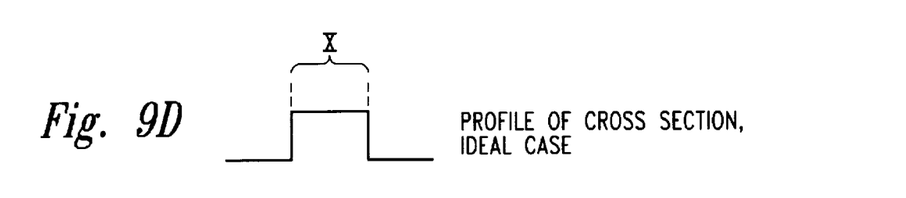
FIG. 9D is a schematic diagram of an inverse reflectance profile along a cross-section in an ideal image.
Figure 9E:
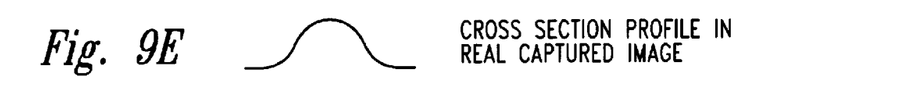
FIG. 9E is a schematic diagram of an inverse reflectance profile along a cross-section in an actual image.

Locating the center of the cross-sectional profile in step 222 can be difficult. FIG. 9A shows an exemplary Code One bar segment and the X dimension formed from the gradient direction therethrough. Likewise, FIGS. 9B and 9C show X dimensions formed through an outer segment of the "L" shaped finder pattern of a Data Matrix symbol and an arcuate bar segment of the "bull's eye" finder pattern of a MaxiCode symbol, respectively. As shown in FIG. 9D, the ideal computed and inverted cross-sectional intensity profile through such segments of FIGS. 9A through 9C is a step function. However, typical symbol images result in a bell-shaped curve as the inverted image intensity gradually increases, and then decreases, through the examined shape.

Figure 10:
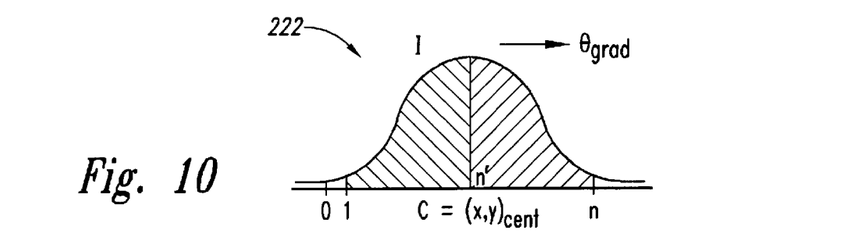
FIG. 10 is a schematic diagram of a method for computing the center of a cross-sectional profile.

Referring to FIG. 10, the CPU 14 in step 222 must locate the centerpoint C of such bell-shaped curve. The bell-shaped curve cross-sectional profile extends from an initial point or location 0 (i.e., the starting point initially identified under step 202), and a final point n, which is the edge pixel opposite from the starting pixel in the gradient direction θ. Under a simple, quick method, the CPU 14 determines the centerpoint C by simply dividing n by 2 to identify a median pixel n' (i.e., n'=n/2). Therefore, the centerpoint C is equal to the coordinates of the pixel at n' under the following equation:

$$C=(x,y)_{center}=(x_{n'}, y_{n'}) \quad (5)$$

Since the CPU 14 has the coordinates of each of the n number of pixels extending through the current shape, the CPU 14 simply identifies the coordinates of the n'th pixel. Such a simple method works well if the cross-sectional profile is indeed a symmetric bell-shaped curve with the centerpoint C aligned with the center of the bell-shaped curve.

Under a more sophisticated method, which compensates for nonsymmetric cross-sectional profiles, the CPU 14 in step 222 computes a center image intensity value under the following equation:

$$\sum_{i=0}^{n'} I_i = \sum_{j=n'}^{n} I_j \quad (6)$$

or any other estimation of the area described in equation (4) in digital form. Under equation (6), the CPU 14 divides the image intensity summation Sum to identify a pixel n' positioned at approximate a midpoint in the profile. Thereafter, the CPU 14 in step 222 chooses the centerpoint C under equation (5) based on the identified center pixel (or counter) value n'.

Referring back to FIG. 4, the CPU 14 in step 224 determines whether a centerpoint exists, or was computed, under step 222. If so, then the CPU 14 in step 226 increments the counter value n by 1. Thereafter, in step 228, the CPU 14 determines whether the counter value n is greater than a threshold or maximum counter value N. If not, then the CPU 14 in step 230 selects a next point in the forward direction (i.e., perpendicular to the gradient direction θ). The CPU 14 in step 230 selects a next linked or edge point in a manner similar to that performed under step 134. Under step 230, the CPU 14 also stores the X and Y axes coordinates of the selected forward point in the list of forward points.

The CPU 14 repeats steps 202, 222, 224, 226, 228, and 230 as the CPU incrementally examines and links pixels through a center of a currently examined shape in the symbol image. As a result, under the first distortion compensating subroutine 200, the CPU 14 tracks the sequentially linked pixels through a center of the shape, rather than its edge. Therefore, if the edge of the shape suffers from breaks or voids, or blurring or other distortions, the CPU can still track through the shape.

If the counter value n is greater than the maximum counter value N in step 228, then the CPU 14 loops back to perform step 112. In other words, after N number of pixels have been examined through the center of the currently examined shape, the CPU 14 ceases performing the more time-consuming subroutine 200, and returns to performing the more rapid pixel linking routine under steps 108 through 134. The more time-consuming subroutine 200 is only performed for a selected number of iterations after which the CPU presumes that any errors or distortions encountered along the previously examined edge have been passed. If, however, the CPU 14 fails to locate forward three points under step 132, the CPU again can perform the steps 202 through 230.

By tracking along the edge of a currently examined shape, then performing the subroutine 200 to track through the center of the shape, and thereafter tracking along the edge, the CPU 14 can simply extend a line through the two tracked edges, effectively interpolating between the two tracked edge portions along a portion which should be parallel to the small portion tracked through the center of the shape. The CPU 14 thereby determines the entire tracked edge of the currently examined shape, despite a distortion which may impact a portion of the edge.

If the CPU 14 fails to find a centerpoint in step 224, the CPU determines in step 232 whether all distortion compensating subroutines have been employed (as described below). If so, then the routine 102 ends and the reader 10 outputs an indication to a user that the symbol image cannot be located within the stored image, or that the entire edge currently being examined has been fully tracked. If, however, not all of such subroutines have been performed, then the CPU 14 loops back to again perform step 150.

After setting the counter value n to 0 in step 150, the CPU 14 performs step 240 in a second distortion compensating subroutine 235. In step 240, the CPU 14 determines an intensity threshold T for the forward neighborhood that includes the forward three points previously determined under step 112. The CPU 14 in step 240 examines a large pixel neighborhood (e.g., 3M×3M) surrounding the current point (x,y) to determine the average pixel intensity T therein. The CPU 14 then compares the image intensity of each pixel in a Q×Q pixel neighborhood to the threshold T. For example, Q is equal to 3 or 5, so that the CPU 14 examines a 3×3 (or 5×5) pixel neighborhood. If a given pixel is greater than the average intensity threshold T, it is set to a binary value of 1; otherwise, it is set to a binary value of 0. As a result, a binary image of the Q×Q pixel neighborhood surrounding the current point (xy) is determined under step 240. Therefore, the system uses a binary boundary following routine to try to continue boundary tracking.

In step 242, the CPU 14 analyzes the binary pixel values in the Q×Q neighborhood to attempt to locate an edge point. The CPU 14 can employ any conventional binary border or edge following routine to track border points therein. If a binary border point is identified in step 242, then the CPU 14 stores the X and Y axes coordinates of the selected forward point in the neighborhood within the list of forward linked points. In step 244, the CPU 14 increments the counter value n by 1, and thereafter in step 246 compares the incremented counter value to the threshold counter value N. If n is less than N, then the CPU 14 again performs the steps 240, 242, 244, and 246.

As a result, the CPU 14 in steps 240 and 242 expand the neighboring points to be examined for a next edge point, from the neighboring points previously examined in step 112. The second distortion compensating subroutine 235 thereby helps identify edge points when a current edge suffers from partial voids, such as a partially damaged bar. Under the subroutine 235, the CPU 14 effectively applies low-pass filtering to again avoid noise sensitivity about the gradient direction of an edge. If the subroutine 200 fails when the profile is too narrow, then the subroutine 235 will continue to track the edge.

If the CPU 14 fails to detect an edge or border point under step 242, then the CPU determines under step 232 whether all methods or subroutines have been performed. If the current counter value n is greater than the threshold value N in step 246, then the CPU 14 again loops back to perform the steps 108 through 134. In other words, the CPU 14 only performs the subroutine 235 for a selected number N of iterations, and then returns to the more time-efficient edge detecting routine of steps 108 through 134.

Under a third distortion compensating subroutine 248 for tracking an edge suffering from distortions, the CPU 14 in step 250 employs a smoothing method in the neighborhood of the current point. Such a smoothing is helpful for compensating for random patterns of black and white pixels surrounding the current edge point, or "salt-and-pepper" noise. Is also helps to close narrow gaps along finder pattern structures due to damages. There can be many different forms of smoothing such as local averaging. As an example, we choose convolution smoothing which, mathematically, is performed under the following equation:

$$S(x, y) = \int_{-\infty}^{\infty} \int_{-\infty}^{\infty} g(x - \xi, y = \tau) I(\xi, \tau) d\xi d\tau \quad (7)$$

where $S(x,y)$ represents the smoothed image, $g(x-\xi, y-\tau)$ represents a smoothing filter, and $I(\xi, \tau)$ represents the image. An isotropic filter is preferably employed for the smoothing filter to thereby allow the smoothing filter to be separated into two terms (i.e., $g(x,y)=g_{1(x)}g_{2(y)}$). As a result, equation (7) is represented by the following equation:

$$S(x, y) = \int_{-\infty}^{\infty} g_2(y - \tau) \left[ \int_{-\infty}^{\infty} g_1(x - \xi) I(\xi, \tau) d\xi \right] d\tau \quad (8)$$

Analyzing the image in only the X dimension yields the following equation:

$$S(x) = \int_{-\infty}^{\infty} g(x - \xi) I(\xi) d\xi \quad (9)$$

The smoothing filter is preferably applied symmetrically with a bell-shaped profile. For example, a Gaussian smoothing filter in 10 is represented by the following equation:

$$g(x) = \frac{1}{\sqrt{2\pi}\sigma} e^{-\frac{x^2}{2\sigma^2}} \quad (10)$$

Figure 11A:
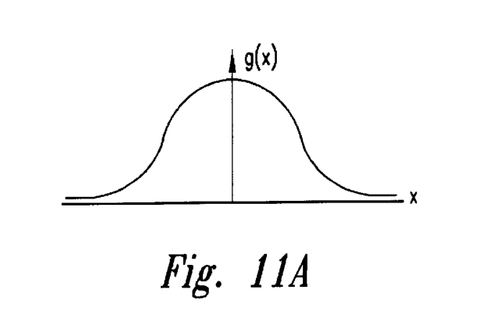
FIG. 11A is a plot of a Gaussian smoothing filter applied along an X axis direction with respect to the currently examined point.
Figure 11B:
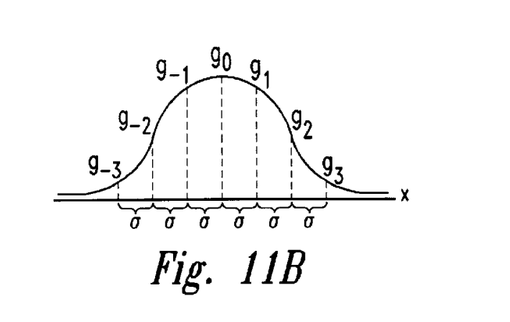
FIG. 11B is a plot of a Gaussian smoothing filter applied along an X axis direction with respect to the currently examined point, as applied at seven discreet intervals.

FIG. 11A shows an exemplary Gaussian function for pixels in a neighborhood along the X axis. In digital form, the CPU 14 samples the Gaussian function by choosing points or samples each at a selected interval σ apart. For example, if a number of samples n is set to 7, samples $g_{-3}$ and $g_3$ are 3σ away from a center sample at $g_0$, as shown in FIG. 11B. In general, the CPU 14 selects a number of samples n equal to 2k+1 to provide an odd number of samples. As a result, with discrete pixels or samples in a neighborhood under the Gaussian smoothing function, equation (9) becomes the following equation:

$$I_s(j) = \sum_{i=j-k}^{j+k} (g_{j-i})(I(i)) \quad (11)$$

where j is the middle of the interval I=(−k, . . . 0, . . . k). In two dimensions, $$I_s(j, k) = \sum_{i=k-K}^{k+K} (g_{k-i})(I_s(i)) \quad (12)$$

The result of the Gaussian smoothing is an image whose abrupt changes in intensity due to high frequency noise and small gaps are greatly reduced. Therefore, subroutines 200's and 235's weaknesses in handling gaps can be compensated for under this method. After smoothing, the subroutine 248 is essentially the same as the main body of the routine 102 from step 126 to step 132.

In step 260, the CPU 14 examines a forward three neighboring points after each point has been subjected to the smoothing filter of step 250. In step 262, the CPU 14 determines whether an edge point exists within the three forward points. If so, the CPU 14 in step 264 selects a next linked or edge point in a manner similar to that performed under step 134. Under step 264, the CPU 14 also stores the X and Y axes coordinates of the selected linked point in the list of linked points.

In step 266, the CPU 14 increments the counter n by 1, and in step 268 determines whether the incremented counter value is greater than the threshold value N. If not, then the CPU 14 loops back to again perform the steps 250 through 268. If the CPU 14 fails to locate an edge point in step 262, then the CPU determines whether all distortion compensating subroutines 200, 235 and 248 have been performed in step 232, as explained above. If the CPU 14 determines in step 268 that the counter value n is greater than the maximum value N, then the CPU again performs the more rapid edge point linking routine under steps 108 through 134.

Figure 12:
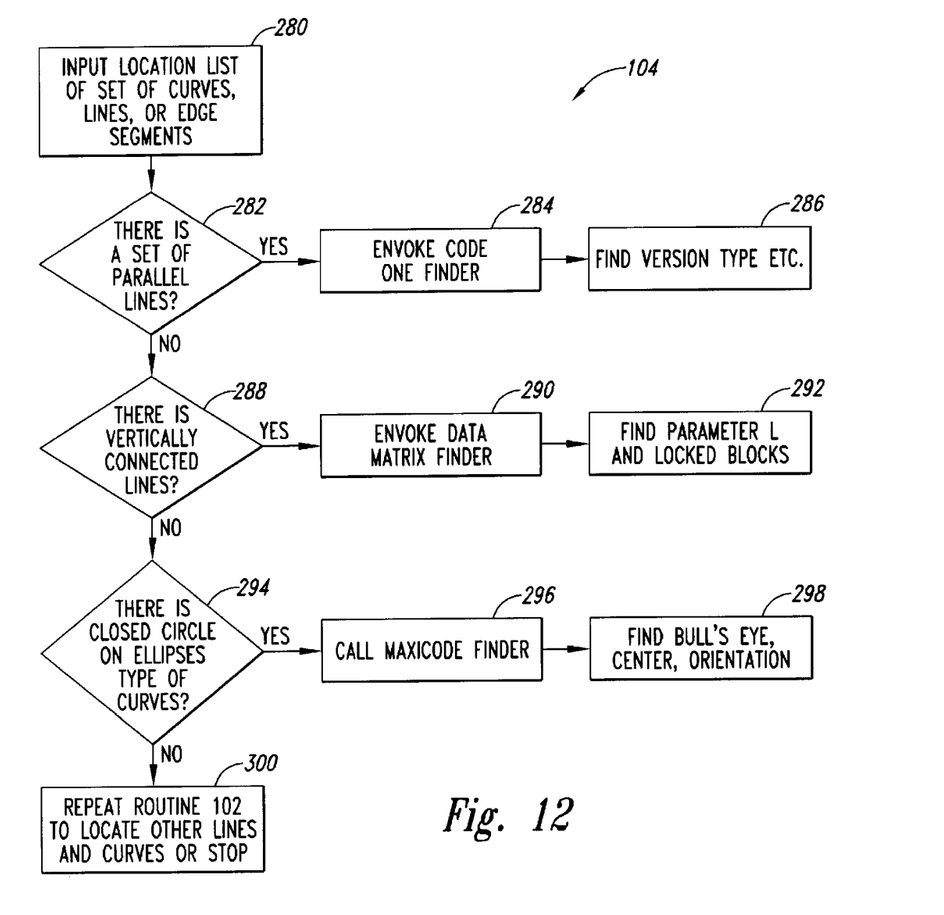
FIG. 12 is a flow diagram of an exemplary routine for determining a relationship data derived from the low-level vision processing of FIG. 4, as performed by the reader of FIG. 1.

After the CPU 14 identifies points along the edge of a currently examined shape under the routine 102, the CPU begins the step or subroutine 104. Referring to FIG. 12, the CPU 14 in step 280 inputs the list of locations of all linked edge points or other points of curves, lines, or edge segments identified under the routine 102. In step 282, the CPU 14 analyzes the list of linked points to determine whether two or more parallel lines have been identified under the routine 102. If so, then the CPU 14 in step 284 presumes that a Code One symbol image has been located within the stored image. Therefore, the CPU 14 invokes a conventional Code One finder routine to more accurately locate the similar image of the Code One symbol within the stored image. For example, the CPU 14 performs a method of locating the center finder pattern for Code One symbols that is described in detail in the inventor's U.S. patent application Ser. No. 08/607,100, entitled "Method and Apparatus for Accurately Locating Data Regions in Stored Images of Symbols," filed Feb. 26, 1996. The finding method employed under step 284 can employ data previously determined under the routines 102 and 104, and thereby avoid performing redundant steps and speed of processing. In step 286, the CPU 14 determines the particular version of the Code One symbol image, and thereafter decodes the symbol image.

If the CPU 14 fails to identify two or more parallel lines in the list of linked points, then in step 288 the CPU determines whether two lines have been identified, one horizontal and one vertical, which meet at approximately 90°. If so, then in step 290, the CPU 14 presumes that the symbol image of a Data Matrix symbol has been located. Therefore, the CPU 14 in step 290 invokes a conventional Data Matrix finding routine. For example, the CPU 14 performs the inventor's method which is described in detail in U.S. patent application Ser. No. 08/654,925, entitled "Method and Apparatus for Locating and Decoding Machine-Readable Symbols, Including Data Matrix Symbols," filed May 29, 1996. Again, the CPU 14 can employ data previously determined under the routines 102 and 104 to omit redundant steps when locating the Data Matrix symbol image. In step 292, the CPU 14 locates the solid and dashed boundaries or finder pattern for the Data Matrix symbol image, determines its version, and thereafter decodes the symbol image.

If the CPU 14 determines that the list of linked points fails to identify a horizontal and vertical line connected at approximately 90°, then in step 294 the CPU determines whether closed rings, circles or ellipses, or portions thereof are detected. If so, then in step 296, the CPU 14 presumes that the symbol image of a MaxiCode symbol has been located within the stored image. The CPU 14 invokes a MaxiCode finding method to locate the MaxiCode symbol image within the stored image. For example, the CPU 14 locates the center bull's eye finder pattern of the MaxiCode symbol image under a method described in detail in U.S. patent application Ser. No. 08/602,624, entitled "Method and Apparatus for Locating and Decoding Machine-Readable Symbols," filed Feb. 16, 1996, or a method described in detail in U.S. patent application Ser. No. 08/549,916, entitled "Method and Apparatus for Locating and Decoding Machine-Readable Symbols," filed Oct. 30, 1995. In step 298, the CPU 14 locates the center finder pattern, determines the orientation of the MaxiCode symbol image, and thereafter decodes the symbol.

If the CPU 14 fails to identify two or more parallel lines, a connected horizontal and vertical line, or one or more rings or substantially closed curves, then the CPU 14 in step 300 repeats the routine 102 and attempts to locate one or more lists of linked points for curves, lines or edges in the stored image. Thereafter, the CPU 14 again performs the steps of routine 104. If the CPU 14 fails to again locate a list of linked points, such as points which exceed a minimum threshold number of pixels, then the routine 104 ends.

The stored image can include more than one symbol image. Therefore, following steps 286, 292 or 298, the CPU 14 can again perform steps 280 through 298 as the CPU attempts to locate symbol images of other symbols stored within the stored image. Additionally, while the routine 104 as described above as locating only three area symbologies (Code One, Data Matrix and MaxiCode), the routine 104 can identify the distinctive lines, curves or other geometric shapes of the distinctive patterns or finder patterns of other data collection symbologies to locate symbols from such symbologies in the stored image. Furthermore, while the exemplary embodiment is generally described above with respect to the single CPU 14 of the reader 10, the routine 100 can be divided among the multiple CPUs 14' of the reader 10'. For example, each of the CPUs 14' can be assigned to perform one of the distortion compensating subroutines 200, 235 and 248.

Overall, an essential step in locating a symbol image within a stored image is to locate the predetermined pattern (typically the finder pattern) of a symbol image. As noted above, most finder patterns consist of basic geometric elements such as bars or rings. Under the routine 100, the CPU 14 can identify various geometric shapes by sequentially linking edge, center or other points within the stored image. As a result, the routine 102 locates basic geometric elements. The routine 104 then compares such located elements to identify one or more patterns corresponding to finder patterns of symbologies. Since the CPU 14 knows before hand the it is looking for such basic geometric patterns, the routine 102 can employ one or more distortion compensating routines for identifying linked points in the stored areas of a symbol image. For example, such distortion compensating subroutines compensate for partial erosion, breaking, blacking, blurring or other distortions which can effect an edge in a symbol image. While other known routines stop at an edge, the embodiments of the present invention attempt to continue through such distortions in the symbol image to compensate for such distortions. Preferably, the routine 102 only employs the distortion compensating subroutines for N number of pixels in order to not unduly burden the processing time of the CPU 14 and to expedite the locating routine 100.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader described above. Various exemplary distortion compensating subroutines, and techniques for identifying shapes or geometric patterns of data collection symbols have been described above, and accordingly, various other subroutines, etc., can be employed under the present invention and a greater or lesser number of subroutines can be employed.

For example, the routine 104 can employ a spline function, such as a non-uniform rational B-spline function to represent perfect curves through several points in each list of linked points. By employing a spline function, the routine 104 can more accurately identify shapes within the stored image, if necessary.

All of the above U.S. patents and applications are incorporated herein by reference as if set forth in their entirety. While the present invention identifies an image of a data collection symbol, the present invention can similarly read visual indicia of other stored images.

These and other changes can be made to the invention in light of the above detailed description. In general, in the following claims, the terms used should not be construed to limit the invention to the specific embodiments disclosed in the specification and the claims, but should be construed to include all machine vision systems that operate under the claims to provide a method for accurately locating visual indicia. Accordingly, the invention is not limited by the disclosure, but instead its scope is to be determined entirely by the following claims.

What is claimed is:

1. In a symbol reading apparatus capable of storing an image of a data collection symbol, the stored image being comprised of a plurality of pixels and the symbol having a predetermined pattern of geometric shapes, a method of locating portions of the shapes within the stored image, the method comprising:

locating a stalking pixel of a shape of the symbol within the stored image;

sequentially identifying adjacent pixels along an edge of the shape within the stored image from the starting pixel;

performing at least one distortion compensating subroutine selected from a plurality of distortion compensating subroutines if an adjacent pixel cannot be located, wherein at least one of the plurality of distortion compensating subroutines does not fill in the adjacent pixel;

selecting at least one linked pixel in the stored image based on the performing;

repeating the sequentially identifying, performing and selecting;

producing a set of pixels that identify at least a portion of the shape based on the repeating;

determining if the set of pixels contains representations of one of several selected patterns of geometric portions for corresponding data collection symbology types, a first selected pattern corresponding to the predetermined pattern of geometric shapes of the data collection symbol, wherein the selected patterns of geometric portions include lines and curves represented by a series of substantially adjacent pixels, and wherein the selected patterns do not represent widths of a plurality of shapes as measured along an intersecting sampling path; and identifying the data collection symbol in the stored image if the detected geometric portions correspond to the first selected pattern.

2. The method of claim 1 wherein sequentially identifying includes:

determining a gradient direction from the starting pixel;

comparing the gradient direction to a predetermined value;

examining a plurality of pixels adjacent to the starting pixel, the adjacent pixels being in forward direction of the starting pixel based on the gradient direction;

selecting a forward pixel as a next edge starting pixel from the plurality of adjacent pixels; and repeating the determining, comparing, examining and selecting a forward pixel until the starting pixel unfavorably compares to the predetermined value or a forward pixel cannot be selected.

3. The method of claim 1 wherein performing at least one distortion compensating subroutine includes:

determining a cross-sectional profile of the shape;

locating a center pixel of the cross-sectional profile;

selecting a pixel in a forward direction based on the center pixel;

determining a new cross-sectional profile of the shape at the pixel in the forward direction; and repeating the locating, selecting and determining a new cross-sectional profile for a selected number of iterations.

4. The method of claim 1 wherein performing at least one distortion compensating subroutine includes:
   determining an average intensity of pixels in a first area about the shape;
   comparing each pixel in a second area to the average intensity, the second area being substantially smaller than the first area and being approximately centered about a selected pixel located under the sequentially identifying;
   selecting a new adjacent pixel in the second area in a forward direction; and
   repeating the comparing and selecting for a selected number of iterations.

5. The method of claim 1 wherein performing at least one distortion compensating subroutine includes:
   adjusting an intensity of each pixel in an area based on a Gaussian smoothing filter, the area being approximately centered about a selected pixel located under the sequentially identifying;
   examining the adjusted intensity of the pixels in the area;
   selecting a new adjacent pixel in the area in a forward direction based on the step of examining; and
   repeating the adjusting, examining and selecting for a selected number of iterations.

6. The method of claim 1 wherein sequentially identifying includes:
   determining an edge direction of the shape;
   identifying upper, upper right and right pixels adjacent to a current pixel as a forward three pixels if the edge direction is between 0 and 90 degrees;
   identifying upper, tipper left and left pixels adjacent to a current pixel as a forward three pixels if the edge direction is between 90 and 180 degrees;
   identifying left, lower left and lower pixels adjacent to a current pixel as a forward three pixels if the edge direction is between 180 and 270 degrees; and
   identifying lower, lower right and right pixels adjacent to a current pixel as a forward three pixels if the edge direction is between 270 and 0 degrees.

7. The method of claim 1 wherein sequentially identifying includes:
   identifying three pixels in a forward direction of a current pixel;
   determining an edge magnitude based on an intensity of the three pixels; and
   selecting a one of the three pixels having a greatest edge magnitude as a next adjacent pixel.

8. The method of claim 1 wherein determining if the set of pixels contains representations includes:
   determining if the set of pixels contains at least two parallel lines, and if so, determining that the data collection symbol is a Code One symbol;
   determining if the set of pixels contains at least two lines having ends intersecting at approximately 90 degrees, and if so, determining that the data collection symbol is a Data Matrix symbol; and
   determining if the set of pixels contains at least a partially enclosed curve, and if so, determining that the data collection symbol is a MaxiCode symbol.

9. A computer implemented method of locating an image of a data collection symbol in a two-dimensional stored image, the two-dimensional stored image being represented by a plurality of points and the data collection symbol having a predetermined pattern of geometric shapes, the method comprising:
   detecting geometric portions of the data collection symbol in the two-dimensional stored image based on groups points in the plurality of points;
   determining, if the detected geometric portions correspond to one of several selected patterns of geometric portions for corresponding data collection symbology types, a first selected pattern corresponding, to the predetermined pattern of geometric shapes of the data collection symbol wherein the selected patterns of geometric portions includes lines and curves represented by a series of substantially adjacent pixels, and wherein the selected patterns do not represent widths of a plurality of shapes as measured along an intersecting sampling path; and
   identifying the data collection symbol in the two-dimensional stored image if the detected geometric portions correspond to the first selected pattern.

10. The method of claim 9 wherein detecting geometric portions includes sequentially identifying adjacent points along an edge of the predetermined pattern within the stored image.

11. The method of claim 9 wherein sequentially identifying includes:
   determining an edge direction from a current point;
   comparing an associated value of the current point to a predetermined value;
   examining a plurality of points adjacent to the current point;
   selecting a new point as a new current point from the plurality of adjacent points; and
   repeating the determining, comparing, examining and selecting a new point until the current point unfavorably compares to the predetermined value.

12. The method of claim 9 wherein detecting geometric portions includes performing at least one distortion compensating subroutine if a portion of one of the geometric shapes suffers from a distortion.

13. The method of claim 9 wherein detecting geometric portions includes:
   determining a cross-sectional length of at least one of the geometric shapes;
   locating a center point of the cross-sectional length;
   selecting a new point based on the center point;
   determining a new cross-sectional length of the geometric shape at the new point; and
   repeating the locating, selecting and determining a new cross-sectional length for a selected number of iterations.

14. The method of claim 9 wherein detecting geometric portions includes:
   determining a value corresponding to points in a first group of points about at least one of the geometric shapes;
   comparing each point in a second group of points to the value, the second group being substantially smaller than the first group;
   selecting a new point in the second group; and
   repeating, at least once, the comparing and selecting.

15. The method of claim 9 wherein detecting geometric portions includes:
   adjusting a value of each point in a group of points based on a smoothing function;
   examining the adjusted value of the points in the group;
   selecting a new point in the group based on the examining; and repeating, at least once, the adjusting, examining and selecting.

16. The method of claim 9 wherein detecting geometric portions includes:
    identifying three points from a current point;
    determining an edge magnitude based on an intensity of the three points;
    selecting a one of the three points having a greatest edge magnitude as a next adjacent point; and
    repeating, at least once, the identifying three points, determining an edge and selecting.

17. The method of claim 9 wherein the data collection symbol is a Code One symbol, and wherein the step of determining includes the step of determining if the detected geometric portions contain the first selected pattern, wherein the first selected pattern includes at least two parallel lines.

18. The method of claim 9 wherein the data collection symbol is a Data Matrix symbol, and wherein the step of determining includes the step of determining if the detected geometric portions contain the first selected pattern, wherein the first selected pattern includes at least two lines intersecting at approximately 90 degrees.

19. The method of claim 9 wherein the data collection symbol is a MaxiCode symbol, and wherein determining includes determining if the detected geometric portions contain the first selected pattern, wherein the first selected pattern includes at least a partially enclosed curve.

20. In a symbol reading apparatus capable of storing an image of a data collection symbol, the stored image being comprised of a plurality of pixels and the symbol being comprised of a plurality of geometric shapes, a method of locating portions of the shapes within the stored image, the method comprising:
    sequentially identifying adjacent pixels along an edge of the shape within the stored image;
    performing at least one distortion compensating subroutine selected from a plurality of distortion compensating subroutines if an adjacent pixel cannot be located, wherein at least one of the plurality of distortion compensating subroutines does not fill in the adjacent pixel;
    selecting at least one linked pixel in the stored image based on the performing;
    producing a set of pixels that identify at least a portion of the shape based on the sequentially identifying and selecting; and
    identifying a selected geometric shape from a set of shapes within the stored image based on the set of pixels, wherein the set of shapes includes lines and curves defined approximately by substantially adjacent pixels, and wherein the selected patterns do not represent widths of a plurality of shapes as measured along an intersecting sampling path.

21. The method of claim 20 wherein sequentially identifying includes:
    determining an edge orientation from the starting pixel;
    comparing a value of the starting pixel to a predetermined value;
    examining a plurality of pixels adjacent to the starting pixel;
    selecting a forward pixel as a next edge starting pixel from the plurality of adjacent pixels; and
    repeating the determining, comparing, examining and selecting a forward pixel until the starting pixel unfavorably compares to the predetermined value.

22. The method of claim 20 wherein performing at least one distortion compensating subroutine includes:
    determining a cross-section of the shape;
    locating a center point of the cross-section;
    selecting a pixel in a forward direction;
    determining a new cross-section of the shape at the pixel in the forward direction; and
    repeating the locating, selecting and determining a new cross-section for a selected number of iterations.

23. The method of claim 20 wherein performing at least one distortion compensating subroutine includes:
    determining an average intensity of pixels in a first area about the shape;
    comparing each pixel in a second area to the average intensity, the second area being substantially smaller than the first area and being approximately centered about a last adjacent pixel located under the sequentially identifying and before the performing;
    selecting a new adjacent pixel in the second area in a forward direction; and
    repeating the comparing and selecting for a selected number of iterations.

24. The method of claim 20 wherein performing at least on e distortion compensating subroutine includes:
    adjusting an intensity of each pixel in an area based on a smoothing filter, the area being approximately centered about a last adjacent pixel located under the sequentially identifying and before the step of performing;
    examining the adjusted intensity of the pixels in the area;
    selecting a new adjacent pixel in the area in a forward direction based on the examining; and
    repeating the adjusting, examining and selecting for a selected number of iterations.

25. The method of claim 20 wherein the sequentially identifying includes:
    identifying three pixels in a forward direction of a current pixel;
    determining an edge magnitude based on an intensity of the three pixels; and
    selecting a one of the three pixels having a greatest edge magnitude as a next adjacent pixel.

26. In a symbol reading apparatus capable of storing an image of a data collection symbol, the stored image being comprised of a plurality of pixels and the symbol having a predetermined pattern of geometric shapes, a method of locating portions of the shapes within the stored image, the method comprising:
    sequentially identifying adjacent pixels along an edge of the shape within the stored image from a starting pixel to produce a set of pixels that identify at least a portion of the shape; and
    determining if the set of pixels contains representations of one of several selected patterns of geometric portions, which includes:
        determining if the set of pixels contains at least two parallel lines, and if so, determining that the data collection symbol is a Code One symbol;
        determining if the set of pixels contains at least two lines having ends intersecting at approximately 90°, and if so, determining that the data collection symbol is a Data Matrix; and
        determining if the set of pixels contains at least a partially enclosed curve, and if so, determining that the data collection symbol is a MaxiCode symbol.

27. A computer implemented method of locating an image of a data collection symbol in a two-dimensional stored image, the two-dimensional stored image being represented by a plurality of points and the data collection symbol having a pattern of geometric shapes, the method comprising:

detecting geometric portions of the data collection symbol in the two-dimensional stored image based on groups of points in the plurality of points, including:

determining a cross-sectional length of at least one of the geometric shapes;

locating a center point of the cross-sectional length;

selecting a new point based on the center point;

determining a new cross-sectional length of the geometric shape at the new point; and         repeating the locating, selecting and determining a new cross-sectional length, for at least one iteration; and     identifying the data collection symbol in the two-dimensional stored image.

28. A computer implemented method of locating an image of a data collection symbol in a two-dimensional stored image, the two-dimensional stored image being represented by a plurality of points and the data collection symbol having a predetermined pattern of geometric shapes, the method comprising:

detecting geometric portions of the data collection symbol in the two-dimensional stored image based on groups of points in the plurality of points;

determining if the detected geometric portions correspond to at least a partially enclosed curve that corresponds to one of several selected patterns of geometric portions; and     identifying the data collection symbol in the two-dimensional stored image as a MaxiCode symbol if the detected geometric portions include at least the partially enclosed curve.

29. In a symbol reading apparatus capable of storing an image of a data collection symbol, the stored image being comprised of a plurality of pixels and the symbol being comprised of a plurality of geometric shapes, a method of locating portions of the shapes within the stored image, the method comprising:

performing at least one distortion compensating subroutine selected from a plurality of distortion compensating subroutines if an adjacent pixel cannot be located, wherein at least one of the plurality of distortion compensating subroutines does not fill in the adjacent pixel, including:

determining a cross-section of at least one of the geometric shapes;

locating a center point of the cross-section;

selecting a pixel in a forward direction;

determining a new cross-section of the determined shape at the selected pixel in the forward direction; and         repeating the locating, selecting and determining a new cross-section for a selected number of iterations; and     identifying a selected geometric shape within the stored image.

* * * * *

UNITED STATES PATENT AND TRADEMARK OFFICE
CERTIFICATE OF CORRECTION

PATENT NO : 6,097,839
DATED : August 1, 2000
INVENTOR(S): Lingnan Liu

It is certified that error appears in the above-identified patent and that said Letters Patent are hereby corrected as shown below:

Column 16, line 11, "stalking" should be --starting--;

Column 17, line 32, "tipper" should be --upper--;

Column 18, line 2, after "groups" insert --of--;

Column 18, line 4, after "determining" delete the comma;

Column 18, line 7, after "corresponding" delete the comma;

Column 18, line 9, after "symbol" insert a comma; and

Column 20, line 26, "on e" should be --one--.

Signed and Sealed this

Tenth Day of April, 2001

*Attest:*

NICHOLAS P. GODICI

*Attesting Officer*  *Acting Director of the United States Patent and Trademark Office*